Aug. 10, 1965    A. WAGNER    3,200,272
ELECTROMOTIVE DRIVE OVERLOAD ARRANGEMENT
Filed Dec. 18, 1961    3 Sheets-Sheet 1

INVENTOR
ADAM WAGNER
BY Toulmin & Toulmin
Attorneys

Aug. 10, 1965  A. WAGNER  3,200,272
ELECTROMOTIVE DRIVE OVERLOAD ARRANGEMENT
Filed Dec. 18, 1961  3 Sheets-Sheet 3

INVENTOR
ADAM WAGNER
BY Toulmin & Toulmin
Attorneys though the overload torque is removed, the motor in the hand tool will still not begin operation until the on-off switch has been opened and closed again.

United States Patent Office 3,200,272
Patented Aug. 10, 1965

3,200,272
ELECTROMOTIVE DRIVE OVERLOAD ARRANGEMENT
Adam Wagner, Garbenheim, Kreis Wetzlar, Germany, assignor to Christian Dunker, Prazisions-Kleinstmotoren - Gesellschaft, Bonndorf, Black Forest, Germany
Filed Dec. 18, 1961, Ser. No. 160,137
8 Claims. (Cl. 310—68)

The present invention relates to electrically driven hand tools, more particularly, to an overload torque arrangement wherein the power circuit to the electric motor is shut off upon occurrence of an overload torque and the tool cannot be operated until the on-off switch is open.

Various forms of torque-responsive overload switches have been provided for electromotive drives which act to switch off the electromotive drive whenever a predetermined torque is exceeded. Such torque-responsive overload switches have generally only been employed in larger electric motors. Such overload switches are generally adjustable so as to vary the overload torque. One manner in which this is accomplished is by adjusting the tension of a spring which acts against the switch. The tension of the spring determines the amount of torque necessary to actuate the switching member. When the adjusted torque is exceeded the power circuit to the electric motor is switched off whereupon the torque exerted by the motor decreases and the spring acts as a return spring to return the switching member into its initial position. This causes the power circuit to the motor to be switched on again. As a result, the power circuit to the motor is repeatedly switched on and off until this circuit is definitely switched off by manipulation of the tool or on-off switch.

One modification in the above-described overload torque arrangement is to provide an overload switch circuit which provides for rotation of the motor in the opposite direction when the motor has been switched off by the overload switch. An on-off switch is provided which is independent of the overload switch and which must be actuated to initiate rotation of the motor in the opposite direction. The actuation of this power switch provides for the return of the overload switch to its initial position.

The previously described torque-responsive overload switches are not suitable for use in electric hand tools because of their relatively high cost. In addition, it is not possible to vary the overload torque without a partial disassembly of the arrangement. Further, the constant repetition of the switching on and off of the electric motor results in overloading the motor since these motors in hand tools are of relatively small sizes. This condition is accentuated in electric hand tools wherein a battery is used as the source of electrical energy. This repeated on and off rapidly dissipates the battery.

It is therefore the principal object of this invention to provide a novel and improved torque-responsive overload switch assembly for electrically driven hand tools.

The disadvantages of prior art overload switches as described above are eliminated and the object of the present invention is achieved by the torque-responsive overload switch assembly described and illustrated herein. The present invention essentially comprises a mechanical interlock member which coacts with both the torque-responsive overload switch and the manually operated on-off switch in such a manner so as to prevent the closing of the switch contacts opened by the overload switch until after the on-off switch in the motor circuit is open. Thus, the repeated switching on and off of the motor is prevented since it is necessary for the operator of the hand tool to release the on-off switch so that the switch is opened and the motor circuit is shut off. Therefore, even though the overload torque is removed, the motor in the hand tool will still not begin operation until the on-off switch has been opened and closed again.

A specific embodiment of the present invention comprises a cylindrical shell or sleeve which is axially movable within the casing of the hand tool when a predetermined overload torque is encountered by the tool. This axial movement of the sleeve will open an overload switch which is connected in the motor circuit. This opening of the switch will stop the motor. Simultaneously with the opening of the overload switch a resilient detent which coacts with the hand tool on-off switch locks the cylindrical sleeve into position so as to prevent the return of the sleeve to its initial position. The on-off switch coacts with the detent arm in such a manner that when the on-off switch is released to open the motor circuit, the detent arm will be disengaged from the cylindrical sleeve. The sleeve will then return to its initial position under the action of a spring. The hand tool motor can now be started merely by depressing the on-off switch to close the motor circuit.

The cylindrical shell is positioned in the casing so as to be concentric with the driving means extending from the motor to the tool attachment. Consequently, this structure requires a minimum of space and hence is particularly adapted for use in electrically driven hand tools.

The present invention also includes a simplified structure for easily adjusting the overload torque. The overload switch and the resilient detent arm are both mounted on a collar which is threadedly secured within the casing of the hand tool. The screwing of this collar will vary the distance that the cylindrical shell must move in order to both open the overload switch and to be engaged by the detent. The greater the distance the cylindrical sleeve must move, the greater will be the torque at which the overload switch is opened. As a result of this structure an infinite adjustment of the overload torque is readily achieved.

The above-described embodiment can be further modified to occupy a still smaller space by constructing the on-off switch in such a manner that it simultaneously coacts with the overload switch and forms a mechanical interlock.

Other objects and advantages of this invention will be apparent upon reference to the accompanying description when taken in conjunction with the following drawings, wherein FIGURE 1 is a longitudinal sectional view of the electromotive drive of a hand tool incorporating the torque-responsive overload switch of the present invention;

FIGURE 7 is a schematic diagram of the electrical circuit utilized in the modification of FIGURES 3 through 6.

Figure 1:
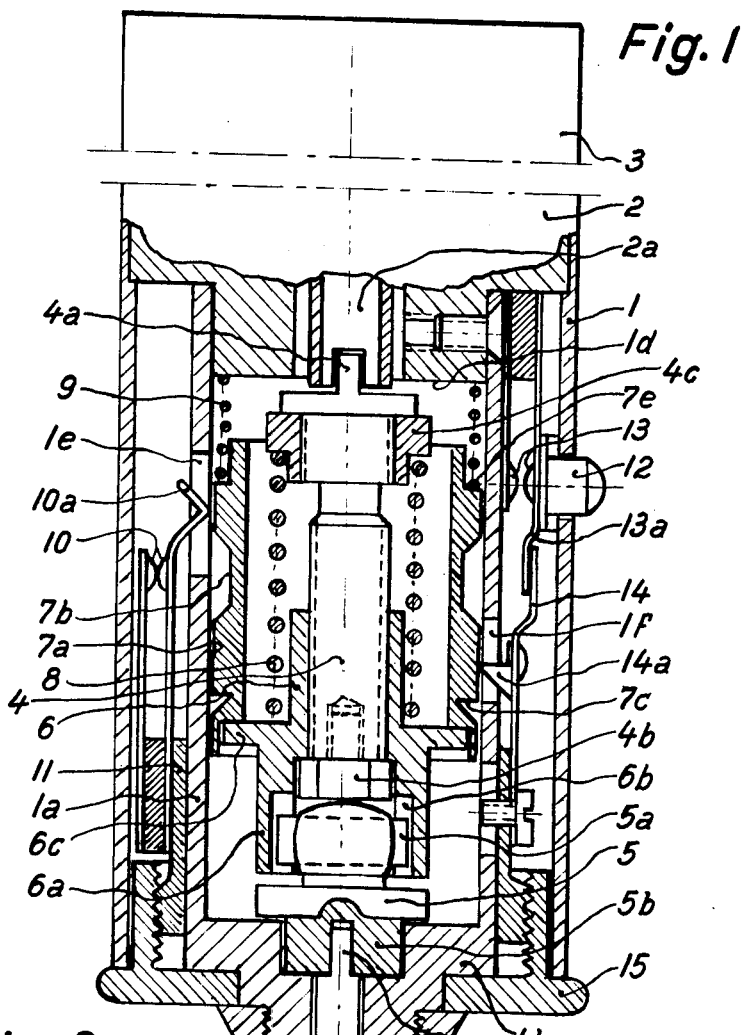

Returning now to the drawings wherein like reference symbols indicate the same parts throughout the various views, there is illustrated in FIGURE 1 a cylindrical casing 1 which can be used as the handle of a hand tool. The casing 1 houses an electric motor 2 driven by a battery 3.

The motor 2 has an output shaft 2a which is drivingly connected to a spindle 4 by means of driving dogs 4a. The spindle 4 is provided with a worm gearing on its outer surface, a stop nut 4b is secured to the other end of the spindle 4 and a collar 4c is mounted on the upper end of the spindle.

The spindle 4 drives an output shaft 5 through the medium of a nut 6 which is threaded on the worm gearing of the spindle. The output shaft 5 comprises spring discs 5a which engage axial grooves 6b in a hollow extension 6a of the nut 6. Thus, a clutch coupling is provided between the nut 6 and the output shaft 5.

The shaft 5 further comprises a coupling 5b for the tool to be attached thereto.

The nut 6 has a flange 6c which engages one end of a cylindrical shell or sleeve 7. The outer periphery of the sleeve 7 is indicated at 7a and is provided with an annular groove 7b and a second annular groove 7c. A coil spring 8 is positioned between the nut 4c and the nut 6 so as to bear against the upper surface of the flange 6c. A second coil spring 9 engages a shoulder 7e formed on the upper end of the sleeve 7 so as to urge the sleeve into engagement with the flange 6c. The spring 9 is relatively weaker in strength than the spring 8.

The annular groove 7b cooperates with a detent on a resilient contact arm 10a which cooperates with a second contact arm so that the contacts 10 form an overload switch. The contact arms of the overload switch 10 are mounted in a collar 11 which is guided for linear axial movement within the casing 1.

The hand tool is provided with an appliance or on-off switch button 12 which is mounted on a resilient contact arm 13a and contacts 13 are provided to form the drive switch for the hand tool.

A resilient detent arm 14 is also mounted on the collar 11 and comprises a triangular-shaped detent 14a which is engageable with the groove 7c on the sleeve 7. The arm 14 is constructed to urge the detent 14a into engagement with the groove 7c but is restrained from doing so by the contact arm 13a which is stronger in strength. However, whenever the switch button 12 is depressed, to close the motor circuit and to cause the tool to operate, the detent 14a can then engage the groove 7c when it cooperates therewith.

A flanged collar 15 is rotatably mounted in one end of the casing 1 and threadedly engages the collar 11. Rotation of the collar 15 will bring about an axial movement of the collar 11 since the collar 11 is guided only for axial movement in the casing Within the casing 1 there is mounted a secondary casing or cylinder 1a having an end 1b from which extends an externally threaded hollow extension 1c for receiving the tool in a manner to be presently described. The upper end of the casing 1a is closed by a wall 1d against which the upper end of the spring 9 bears. The casing 1a has a slot 1e through which extends the detent portion of the resilient contact arm 10a. There is another slot 1f through which extends the detent 14a.

A hollow shaft 20 is threaded on the external threads indicated at 20a of the tubular extension 1c. A tool whose shaft is seen at 21 has an axially projecting tongue 21a which is received in a transverse groove in the coupling 5b. In this manner the hollow shaft 20 is simultaneously connected with the casing 1 so as to be rigid therewith.

Figure 3:
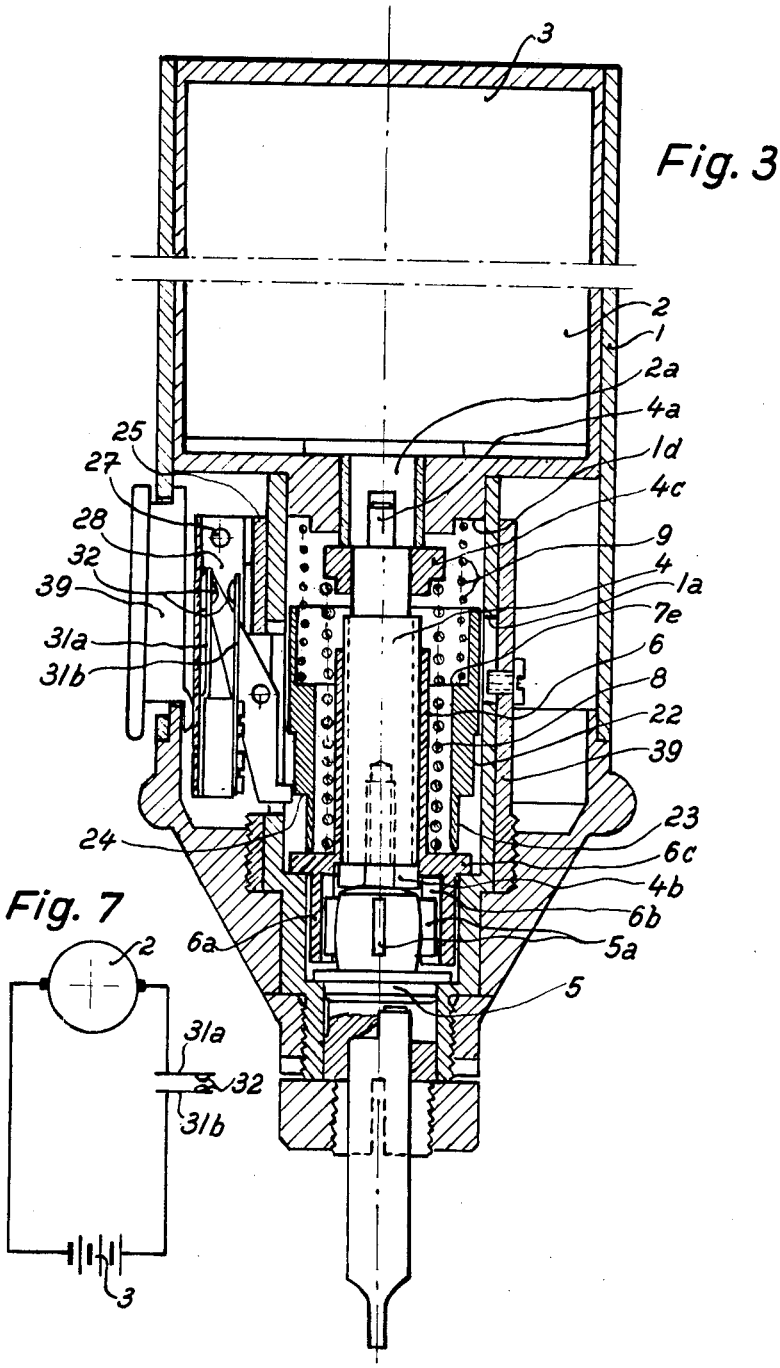
FIGURE 3 is a view, similar to that of FIGURE 1, but showing a modification of the torque-responsive overload switch assembly.

The above-described method of securing a tool in the motor is only one example and other structures can be used such as adjustable jaws as illustrated in the modification of FIGURE 3.

Figure 2:
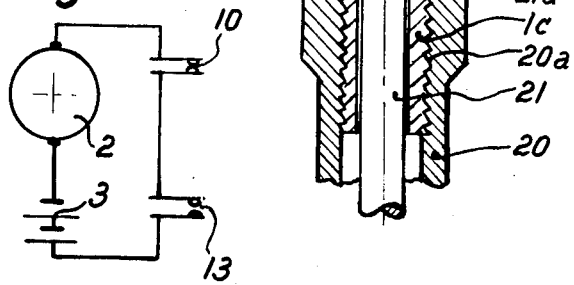
FIGURE 2 is a schematic diagram of the electrical circuit interconnecting the motor, source of electrical energy and switches of the embodiment illustrated in FIGURE 1.

The overload switch 10 and the on-off switch 13 are so positioned that they are electrically insulated from each other and are connected by means of electrical leads in the manner as shown in the circuit diagram in FIGURE 2. These switches are in series with the motor 2 and the source of electrical energy 3. In the event a battery is used as the source of current one terminal of the motor 2 and one terminal of the battery 3 can be connected to ground such as to the metallic casing 1.

With respect to the operation of the torque-responsive overload switch assembly previously described, the parts illustrated in FIGURE 1 are shown in the position when the motor is not energized. In order to commence the operation of the hand tool and to rotate the tool 21 the switch button 12 is manually depressed to close the contacts 13. Since the overload switch contacts 10 are already closed a close circuit will result as can be seen by reference to FIGURE 2.

During the normal operation of the motor the detent of the contact arm 10a engages the peripheral surface 7a of the cylindrical sleeve 7. This maintains the contacts 10 closed.

In the event a predetermined torque is encountered by the tool 21, the driving connection between the clutch 6a and the member 5 will be broken by the action of the overload clutch. The spindle 4, however, will continue to rotate since it is powered by the motor 2. This will cause the nut 6 to be moved along the worm gearing of the spindle 4 and the movement of the nut 6 will also axially move the sleeve 7 upwardly, as viewed in FIGURE 1. This upward movement of the sleeve 7 will continue until the detent on the contact arm 10a drops into the annular groove 7b to open the overload switch 10. The opening of this overload switch will break the circuit and cause the operation of the motor to cease.

Simultaneously with the opening of the overload clutch detent 14a will engage the annular groove 7c under the action of the resilient arm 14. The arm 14 is capable of movement inwardly towards the sleeve 7 since the switch button 12 is depressed and the contacts 13 are closed.

When the overload is released, the nut 6 will return to its initial position but the sleeve 7 will be held in its advance position by the locking action of the detent 14a engaged in the groove 7c.

Only when the switch button 12 is released to open the on-off switch 13 will the detent 14a be released from the groove 7c. When this occurs the cylidrical shell or sleeve 7 is returned to its abutting position with respect to the nut 6 under the action of the spring 9. The components of the hand tool are now in position so that operation of the tool can be started again by depressing the switch button 12.

The torque at which the overload switch is opened can be adjusted merely by rotating the collar 15 so as to increase the axial distance that the sleeve 7 must move before the detent on the contact arm 10a engages the annular groove 7b. As mentioned above, rotation of the collar 15 will cause an axial movement of the collar 11 which is guided for axial movement in the casing. The axial movement of the collar 11 will similarly move axially the overload switch contact arms and the resilient detent arm 14.

In the event a greater adjustment in the overload torque is desired then the springs 8 and 9 must be replaced by suitable springs. The adjustment of the torque possible by rotation of the collar 15 is only within a limited range but this adjustment can be made very fine.

Proceeding next to FIGURES 3 through 6 an embodiment of the invention is illustrated wherein only a single pair of contacts is employed. Since this modification employs many of the same components in the embodiment of FIGURE 1, these corresponding and similar components are identified by the same reference symbols.

In this modification the cylindrical shell or sleeve 7 has two radially indented peripheral portions 22 and 23 which are separated by a shoulder 24.

There is a hollow cylindrical member 25 slidably mounted on the casing 1a. The cylinder 25 has a tab 26 radially extending therefrom and pivotally mounted on this tab at the pivot point 27 is a lever 28. The lever 28 has a longitudinally extending surface 29 and is biassed outwardly by a spring 30.

Mounted on the lever 28 are contact arms 31a and 31b having contacts 32a and 32b respectively thereon. The contact arms 31a and 31b are electrically insulated from each other and the contacts 32a and 32b function both as the torque-responsive overload switch and as the on-off switch for the hand tool.

The outer end of the contact arm 31a is fixedly connected with one end 33 of a two-armed lever 34 which is pivotally mounted at 35 on the lever 50. The other end of the two-armed lever is indicated at 36 and includes a tab 37 which, in normal position, engages the outer periphery 22 of the sleeve 7.

Figure 4:
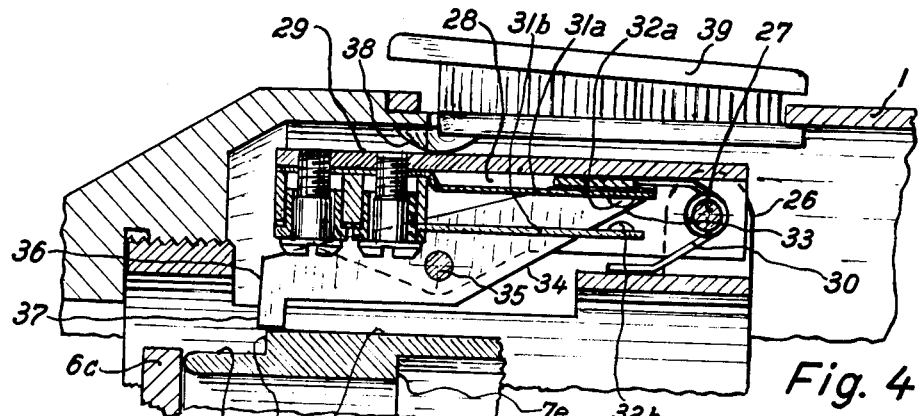
FIGURES 4 through 6 are portions of the modification of FIGURE 3 but in enlarged scale and showing the various positions of the on-off switch and the overload switch contact arms during the operation of the mechanism.
Figure 5:
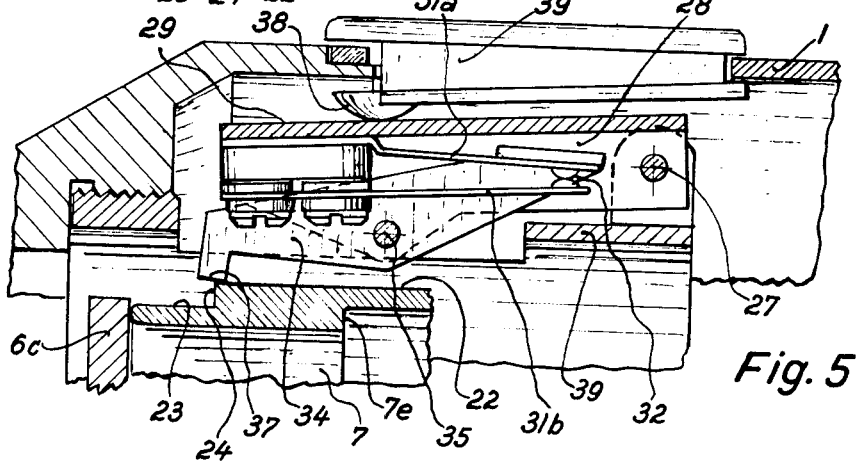
Figure 6:
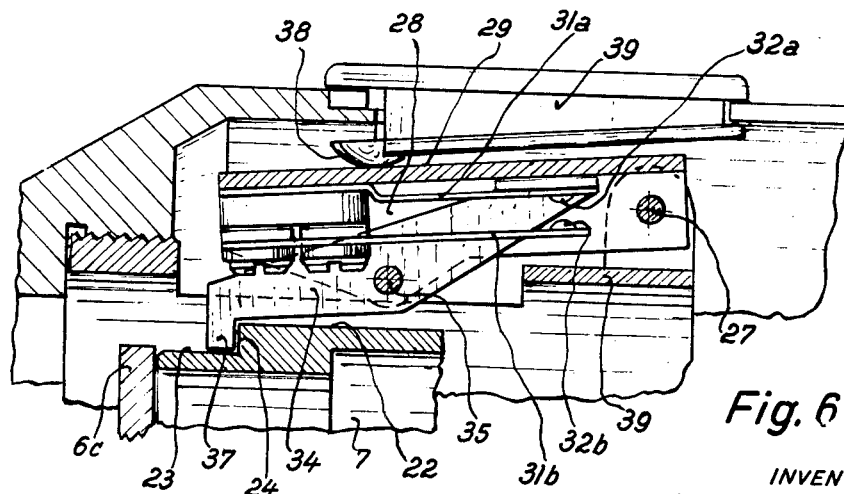

The surface 29 of the lever 28 engages a cam 38 mounted on a pressure plate 39 which is pivotally mounted in the casing 1 as may be seen in FIGURES 4 through 6. The pressure plate 39 is movable in a radial direction for a limited distance.

In the operation of this modification the pressure plate 39 which corresponds to the switch button 12 of the embodiment shown in FIGURE 1 is manually pressed into the position shown in FIGURE 5. The lever 28 then pivots around its axis 27 and the contact arm 31b also pivots so as to close the contacts 32a and 32b. The closing of the contacts switches on the motor and the tool is in operation. The components are now in the position as illustrated in FIGURE 5.

When a predetermined torque is exceeded during operation, the cylindrical shell 7 moves axially in the same manner as previously described. Accordingly, the detent 37 which normally engages the peripheral surface 22 is shifted onto the peripheral surface 23 and maintains the cylinder 7 in its position by locking against the shoulder 24. Accordingly, the upper end 33 of the lever 34 pivots upwardly around the axis 35 and opens the contacts to the position as shown in FIGURE 6. This opens the circuit of the motor and the power tool ceases operation.

The nut 6 is returned to its initial position under the action of the spring 8. However, the shell 7 remains in its moved position because of the locking effect between the detent 37 and the shoulder 24. This locking will remain as long as the switch button or pressure plate 39 is in its depressed position.

The motor can again be operated only after the pressure plate 39 is released so that the components can return to their initial positions under the action of the spring 30 as shown in FIGURES 3 and 4. The cylinder 7 is thus released from the detent 37 and returns to its initial position under the action of its spring 9. The motor can again be operated in the above-described manner by pressing down the pressure plate 39.

It is pointed out that this modification requires only one pair of contacts which together with its actuating members and the mechanical interlock is combined in a simple unit that can be constructed as a single part. In addition, the cylindrical shell 7 must only be provided with surfaces of varying diameters such as 22 and 23 and the necessity for the annular grooves is eliminated.

Thus it can be seen that the present invention provides a simplified yet effective torque-responsive overload switch which, because of its compact arrangement, is readily adapted for electrically operated hand tools.

It will be understood that this invention is susceptible to modification in order to adapt it to different usages and conditions and, accordingly, it is desired to comprehend such modifications within this invention as may fall within the scope of the appended claims.

What is claimed as this invention is:

1. A hand tool comprising a casing, an electric motor in said casing, an electric circuit connecting said motor with a source of electrical energy, driving means including an overload clutch driven by said electric motor, tool attachment means driven by said driving means, a cylindrical shell axially movable in said casing, an overload switch governing said motor circuit and normally in circuit closing position, there being means on said shell for placing said overload switch in circuit opening position upon axial movement of said shell and lock means also thereon, an on-off switch governing said motor circuit and normally in a circuit opening position, locking means engageable with said shell lock means and biased by said on-off switch into a disengaged position, means on said overload clutch for axially moving said shell when a predetermined torque is encountered by said driving means so that said overload switch is placed in circuit opening position and said shell is locked in position by said locking means, said locking means being disengaged from said shell lock means when said on-off switch is released and returned to its circuit opening position whereby said shell is returned to its initial position.

2. A hand tool comprising a casing, an electric motor in said casing, an electric circuit connecting said motor with a source of electrical energy, driving means including an overload clutch driven by said electric motor, a tool attachment means driven by said driving means, a cylindrical shell axially movable in said casing, said shell having first and second annular grooves thereon, an overload switch in said motor circuit having a resilient contact arm normally biassed by said shell into the closed position and engageable with said first annular groove, an on-off switch in said motor circuit and comprising a resilient contact arm normally in the open position, a resilient detent arm held in a normal position by said on-off switch resilient contact arm and engageable with said second annular groove, means on said overload clutch for axially moving said shell when a predetermined torque is encountered by said driving means so that said grooves are engaged by the respective contact and detent arms, said detent arm being so shaped so as to maintain said shell in the axially grooved position after the overload is removed and said axially movable means returns to its initial position, said on-off switch resilient arm being stronger than said resilient detent arm so that said detent arm is disengaged from said second annular groove when said resilient contact arm is released and returns to its normal open position.

3. A hand tool comprising a casing, an electric motor in said casing, an electric circuit connecting said motor with a source of electrical energy, driving means including an overload clutch driven by said electric motor, tool attachment means driven by said driving means, a cylindrical shell axially movable in said casing, an overload switch in said motor circuit and normally in the closed position, there being means on said shell for opening said overload switch upon axial movement of said shell and lock means also thereon, an on-off switch in said motor circuit and normally in an open positon, resilient means engageable with said shell lock means and biassed by said on-off switch into a disengaged position, means on said overload clutch for axially moving said shell when a predetermined torque is encountered by said driving means so that said overload switch is opened and said shell is locked in position by said resilient means, said resilient means being disengaged from said shell lock means when said on-off switch is released and returned to its open position whereby said shell is returned to its initial position, and axially displaceable means in said casing upon which both said overload switch and resilient means are mounted so that the axial distance the shell must move to engage both said overload switch and said resilient means can be adjusted.

4. A hand tool comprising a casing, an electric motor in said casing, an electric circuit connecting said motor with a source of electrical energy, driving means including an overload clutch driven by said electric motor, tool attachment means driven by said driving means, a cylindrical shell axially movable in said casing, an overload switch in said motor circuit and normally in the closed position, there being means on said shell for opening said overload switch upon axial movement of said shell and lock means also thereon, an on-off switch in said motor circuit and normally in an open position, resilient means engageable with said shell lock means and biassed by said on-off switch into a disengaged position, means on said overload clutch for axially moving said shell when a predetermined torque is encountered by said driving means so that said overload switch is opened and said shell is locked in position by said resilient means, said resilient means being disengaged from said shell lock means when said on-off switch is released and returned to its open position whereby said shell is returned to its initial position, a sleeve rotatably mounted in said casing, axially displaceable means threadedly mounted in said sleeve and upon which both said overload switch and resilient means are mounted so that the axial distance the shell must move to engage both said overload switch and said resilient means can be adjusted.

5. A hand tool comprising a casing, an electric motor in said casing, driving means including an overload clutch driven by said electric motor and adapted to drive a tool, a cylindrical shell axially movable in said casing, said shell having first and second annular grooves thereon, an overload switch having a resilient contact arm normally biassed by said shell into the closed position and engageable with said first annular groove, an on-off switch comprising a resilient contact arm normally in the open position, a resilient detent arm held in a normal position by said on-off switch resilient contact arm and engageable with said second annular groove, means on said overload clutch for axially moving said shell when a predetermined torque is encountered by said driving means so that said grooves are engaged by the respective contact and detent arms, said detent arm being so shaped so as to maintain said shell in its moved position after the overload is removed and said axially movable means returns to its initial position, said on-off switch resilient arm being stronger than said resilient detent arm so that said detent arm is disengaged from said second annular groove when said resilient contact arm is released and returns to its normal open position.

6. A hand tool as claimed in claim 5 wherein said driving means includes a shaft having one end connected to the output shaft of said electric motor and having worm gearing thereon, a nut mounted on said worm gearing adjacent the other end of said shaft, a spring urging said nut towards said other end, a second spring urging said shell into engagement with said nut, said overload clutch being connected to said nut, tool attachment means connected to said overload clutch so that when a predetermined torque is encountered by said tool attachment means, said nut moves on said shaft against said first spring to move said shell.

7. A hand tool comprising a casing, an electric motor in said casing, an electrical circuit connecting said motor with a source of electrical energy, driving means including an overload clutch driven by said electric motor, a first cylindrical shell axially movable in said casing, said shell having an annular groove on the outer surface thereof, a second cylindrical shell in said casing and concentric with said first cylindrical shell, a first lever pivotally mounted on said second cylindrical shell, a pair of resilient contact arms mounted on said first lever, a two-armed lever pivotally mounted on said first lever, there being a tab on one end of said two-armed lever engageable with said first cylindrical shell annular groove, the other end of said two-armed lever being connected to one of said contact arms, an on-off switch on said casing and engageable with said contact arms to close the same when said on-off switch is depressed, means on said overload clutch for axially moving said first cylindrical shell when a predetermined torque is encountered by said driving means so that said groove is engaged by said tab whereby said two-armed lever is pivoted to open said contacts, said tab being so shaped so as to retain said first cylindrical shell in its moved position after the overload is removed and said axially movable means returns to its initial position.

8. A hand tool as claimed in claim 7 wherein said on-off switch comprises a lever having one end pivotally mounted on said casing and the other end having a cam contacting a surface of said first lever, a spring urging said first lever into engagement with said on-off switch cam so that said on-off switch lever is urged outwardly when manual pressure is released therefrom and said contact arms are open.

References Cited by the Examiner
UNITED STATES PATENTS

| | | | |
|---|---|---|---|
| 2,348,656 | 5/44 | Scofield et al. | 310—68.1 |
| 2,431,316 | 11/47 | Dudley et al. | 310—68.2 |
| 2,464,847 | 3/49 | Coffey | 310—68.2 |
| 2,592,649 | 4/52 | Brackett | 310—68.2 |

MILTON O. HIRSHFIELD, *Primary Examiner.*